United States Patent [19]

Janes et al.

[11] 4,419,582

[45] Dec. 6, 1983

[54] USE OF AUTOIONIZATION TRANSITION ABSORPTION PEAKS IN ISOTOPICALLY SELECTIVE PHOTOEXCITATION

[75] Inventors: George S. Janes, Lincoln; Robert E. Schlier, Concord, both of Mass.

[73] Assignee: Jersey Nuclear-Avco Isotopes, Inc., Bellevue, Wash.

[21] Appl. No.: 239,521

[22] Filed: Mar. 2, 1981

Related U.S. Application Data

[63] Continuation of Ser. No. 861,700, Dec. 19, 1977, abandoned.

[51] Int. Cl.³ .............................................. B01D 59/00
[52] U.S. Cl. .................................. 250/424; 250/423 P
[58] Field of Search ................. 250/423 P, 424, 492; 204/157.1 R

[56] References Cited

U.S. PATENT DOCUMENTS

| | | | |
|---|---|---|---|
| 3,772,519 | 11/1973 | Levy et al. | 250/41.9 G |
| 3,924,937 | 12/1975 | Munroe et al. | 350/200 |
| 3,939,354 | 2/1976 | Janes | 250/423 P X |
| 3,944,825 | 3/1976 | Levy et al. | 204/157.1 R |
| 4,009,391 | 2/1977 | Janes et al. | 250/423 P X |
| 4,023,038 | 5/1977 | Janes et al. | 250/423 P |
| 4,038,549 | 7/1977 | Janes et al. | 250/423 P |
| 4,049,515 | 9/1977 | Robinson et al. | 204/157.1 R |
| 4,156,144 | 5/1974 | Pike et al. | 250/423 P |

FOREIGN PATENT DOCUMENTS 807116 of 1974 Belgium .
2312194 3/1973 Fed. Rep. of Germany .

OTHER PUBLICATIONS

Snavely, B. B., "Isotope Separation Using Tunable Lasers" Laser 75: Opto-Electronics Conf. Proc. Jun. 24-27, 1975 Munich, Ger.

*Primary Examiner*—Deborah L. Kyle
*Attorney, Agent, or Firm*—Weingarten, Schurgin, Gagnebin & Hayes

[57] ABSTRACT

Apparatus and process for isotopically selective multi-step photoionization in which the final or ionizing step is tuned to produce a specific transition to an excited state above ionization for which the ionization cross-section is substantially greater than for ionization transitions in general. The autoionization transition to an ionized state is typically made from a highly excited bound state which is reached in one or two isotopically selective energy jumps from the ground state or other low-lying levels. The isotope shift for the ionization transition is typically small compared to the bandwidth of the ionization transition and relatively broad band photoionization radiation covering the entire absorption line can be employed. Broad band radiation is more economic and is preferable for use wherever possible. A technique is also shown for identifying the ionization transitions of augmented cross-section.

39 Claims, 4 Drawing Figures

U.S. Patent  Dec. 6, 1983  4,419,582
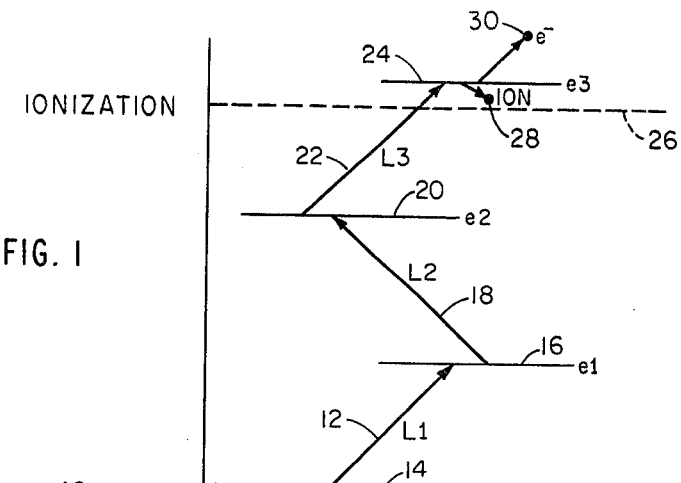
FIG. 1
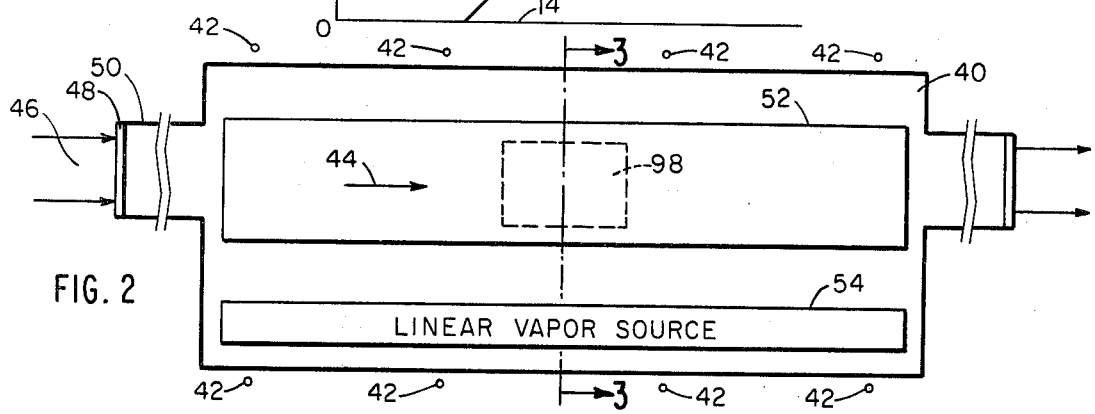
FIG. 2
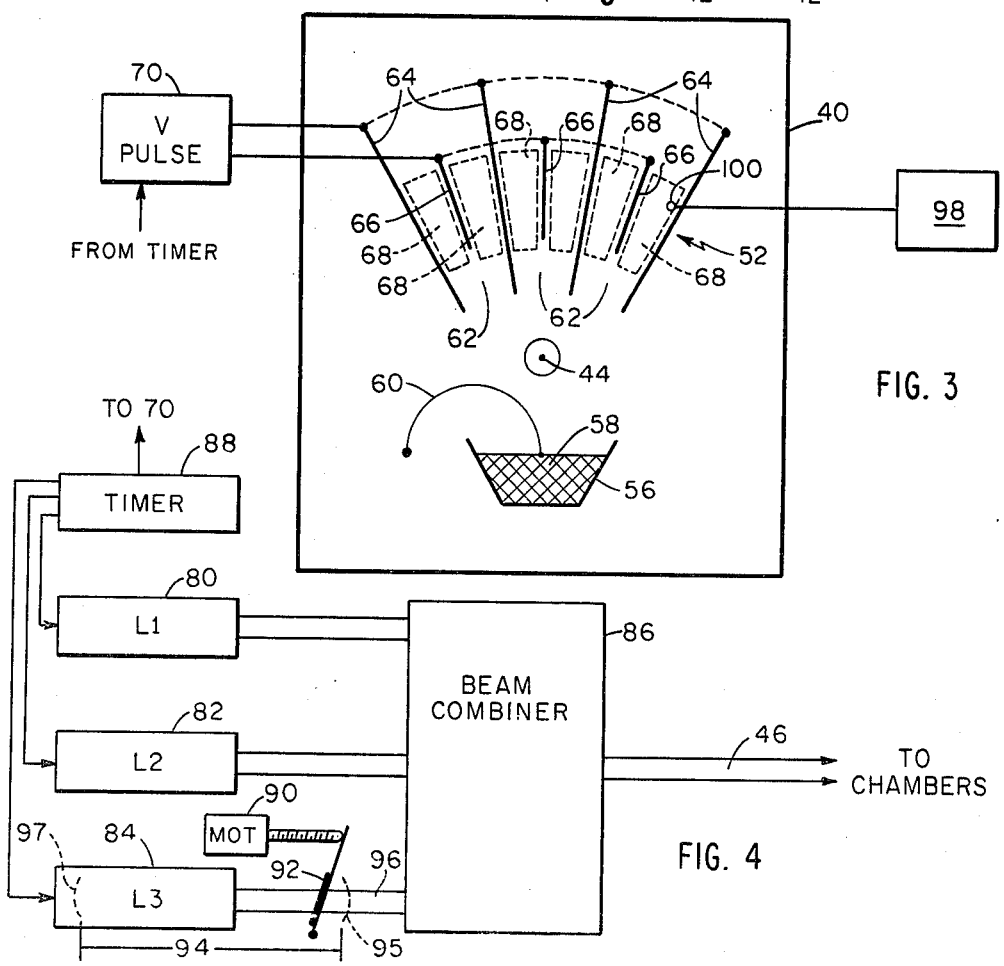
FIG. 3
FIG. 4

USE OF AUTOIONIZATION TRANSITION ABSORPTION PEAKS IN ISOTOPICALLY SELECTIVE PHOTOEXCITATION

This is a continuation of application Ser. No. 861,700, filed Dec. 19, 1977 now abandoned.

FIELD OF THE INVENTION

The present invention relates to photoionization methods and apparatus and in particular to a photoionization transition of increased cross-section.

BACKGROUND OF THE INVENTION

By way of background, reference is made to the prior disclosures of techniques for isotopically selective photoexcitation and ionization of uranium as represented in commonly assigned U. S. Pat. No. 3,772,519, 3,994,947 and Belgian Pat. No. 807.118, and additionally to German patent publication 2,312,194. The techniques there presented include photoexcitation in one or more steps along with photoionization which may be via an autoionization transition. As known in the art, autoionization is a transition which excites particles to an energy level above ionization from which it degenerates into an ion and a released electron. In application to uranium enrichment the suggested utilization of an autoionization transition would have the advantage of increasing the normally low cross-section for ionization, thereby reducing the requirements on the ionization excitation source or laser.

Until the present invention, however, efficient utilization of autoionization in an isotope separation technique has not been identified.

BRIEF SUMMARY OF THE INVENTION

The present invention contemplates an improvement in the isotopically selective ionization process making use of characteristics of the autoionization transition. The improvement more efficiently achieves the autoionization advantages of ionization from an excited state through a transition having an enhanced cross-section as opposed to ionization transitions in general.

The improvement of the present invention is made possible by the development of a technique for detecting the relative cross-sections for photoionization transitions from a selected excited state. The technique employs frequency scanning of time-sequenced lasers in order to monitor ionization over a spectrum of absorption lines to the continuum from a selected excited state. In this manner transitions to the continuum of increased cross-sections, autoionization transitions as used herein, are identified.

The process of photoionization with enhanced ionization cross-sections as thus defined has led to a system for producing a photoionization transition with radiation of identified properties such as spectral width and frequency. at which the enhanced cross-sections occur and may be efficiently utilized. The process typically employs two, three or four energy steps, the first being isotopically selective and the last being the autoionization step. This latter step proceeds from a highly excited state to the ionization continuum and typically to a level within an identified energy range above the ionization level. Because the autoionized bound state has found to be very short lived, the absorption line for the photoionization process with enhanced cross-section tends to be relatively broad in frequency as compared to absorption lines between excited states. The isotope shift between the desired and undesired isotopes is a fraction of this bandwidth. As a result, the preferred embodiment employs moderately broad banded, less intense photoionization radiation, there being no reason to limit bandwidth for isotopic selectivity. The invention thus achieves the advantage of more efficient generation of laser ionization radiation and reduces the chance for non-selectivity from the use of intense ionizing radiation.

The ionized particles may then be separated for collection on predetermined surfaces in response to forces applied to them. These forces are preferably produced by crossed magnetic and electric fields, in the nature of an MHD accelerator, to direct the ionized particles away from an original flow direction.

BRIEF DESCRIPTION OF THE DRAWING

These and other features of the present invention are more fully set forth below in the detailed description of the preferred embodiment, presented for purposes of illustration and not by way of limitation, and in the accompanying drawing, of which:

FIG. 1 is an energy step diagram useful in illustrating the method of the present invention;

FIG. 2 is a view of simplified apparatus for use in practicing the present invention;

FIG. 3 is an interior view of the apparatus of FIG. 2; and

FIG. 4 is a view of laser apparatus for generating the excitation and ionization radiation for use in the present invention, and further includes apparatus for use in identifying autoionization transitions, photoionization transitions with improved cross-sections.

DETAILED DESCRIPTION OF THE INVENTION

The present invention contemplates a technique for producing isotopically selective multistep photoionization with improved efficiency in the use of autoionization transitions of enhanced cross-section. Isotopic selectivity is achieved with appropriate tuning of transitions between bound states, while the transition to the ionization continuum is achieved in a manner which makes optimal use of the characteristic of the enhanced cross-section for autoionization.

A transition from a highly excited, but bound state to the ionized states is defined as the ionization transition. This transition typically employs radiation energy just sufficient to reach the ionized level, more being unnecessary. Such as ionization transition is normally much less probable of occurrence, of low cross-section, and is thus of low efficiency. Apparatus has now been devised which confirms the existence and identifies the location of numerous peaks in the ionization cross-section over a range of energies well above the ionization level. The peaks exhibit very significant enhancement in the cross-section over ionization transitions in general. These peaks make it advantageous to ionize excited particles by excitation to one of the elevated levels above ionization on a transition of enhanced cross-section.

The upper state reached by the enhanced cross-section, autoionization transition is sometimes interpreted as consisting of an electronically excited ion core to which is attached a loosely bound electron wherein the whole ensemble contains sufficient energy so that when the excited ion core decays to the ion ground state, the accompanying energy release is sufficient to eject the electron. This results in ionization. These decays typically occur in times comparable with $10^{-11}$ seconds, and will in accordance with uncertainty principles of physics exhibit spectral line widths on the order of 100 GHZ. These widths are large relative to any Doppler or isotope shifts, but sufficiently narrow to exhibit significant cross-section peaks.

This situation is advantageously exploited by the use of moderately broad banded radiation tuned for an autoionization transition of enhanced cross-section. The broad banded radiation is more efficiently generated, but because of the large width of the peak is kept within the range of enhanced cross-section. With autoionization radiation spread over this relatively wide peak, a greater ionization cross-section is achieved and less intense radiation is required. With less intense radiation, the probability of non-selective ionization by multiphoton absorption from the ground state is reduced.

The invention is more particularly illustrated with reference to FIG. 1 of the drawing in which an energy step diagram is illustrated for the preferred form of isotopically selective photoionization in accordance with the present invention. As shown there, a first transition 12 is produced from the ground state 14, or possibly low-lying thermally excited states, to a first excited state 16 in response to isotopically selective laser radiation from a first laser. Excitation from state 16 occurs in a second energy step 18 to a second excited state 20. The radiation producing the transition 18 may or may not be tuned for isotopic selectivity as desired. From the second excited state 20 a final photoionization transition 22 is produced to a third excited state 24 which is above the ionization level 26. From the excited state 24, the excited atom automatically decays into an ion 28 and a released electron 30. Instead of two steps 12 and 14, one, three or more steps may be used. The intermediate energy levels may be selected from known tabulations such as: LA-4501, *Present Status of the Analyses of the First and Second Spectra of Uranium (U I and U II) as Derived from Measurements of Optical Spectra*, issued October 1971.

The ionization level 26 for uranium in elemental form as a vapor of atomic particles is approximately 6.18 ev or just below 50,000.0 wave numbers. The frequency for the transition 22 is typically in the range of 5,800–6,000 angstroms (16,667–17,241 wave numbers) and the third excited state 24 is typically in the range of 50 to 300 wave numbers above the ionization level 26. In that form, each of the transitions 12, 18 and 22 is approximately ⅓ of the total ionization potential for the uranium atom, as a typical relationship. The radiations for the transitions 12, 18 and 22 are typically applied simultaneously but may be slightly staggered in the time sequence of occurrence of each transition as described below.

Lasers employed for each of the transitions 12, 18 and 22 are typically tunable dye lasers, one example of which is the Dial-A-Line laser, where Dial-A-Line is a registered trademark of the Avco Everett Research Laboratory, Everett, Mass. The final laser for the transition 22 is preferably tuned to encompass a broader bandwidth than the bandwidth used for transitions between excited states. In particular, due to the uncertainty principle discussed above, the radiation absorption bandwidth for photoionization is on the order of 0.5 angstroms or approximately 1.5 wave numbers at the typical frequencies used. This is over an order of magnitude wider than typically encountered differences between absorption lines for different isotopes at the same transition.

As a result, isotopic selectivity must be produced by selective excitation in lower transitions such as transitions 12 and 18. This permits the transition 22 to be achieved with a broad band laser approximately ½ angstroms in breadth which is capable of more efficient lasing by utilizing less frequency limiting in the dye laser as opposed to other transitions.

In accordance with the technique for identifying specific ionization transitions for excitation to the third excited state 24, as described below, a transition may be selected having an improvement in cross-section of one, two or more orders of magnitude greatly overcoming the previous difficulty encountered in achieving ionization due to the relatively small cross-section.

With respect to FIGS. 2 and 3, apparatus is shown by which the present invention may be practiced, in the main, the apparatus conforms to that shown in U.S. Pat. No. 3,939,354, commonly assigned and incorporated herein by reference.

The apparatus includes a chamber 40 which is surrounded by a set of coils 42 carrying a current for producing a magnetic field 44 axially within the chamber 40.

Radiation is applied in a laser beam 46 through a window 48 on an extension pipe 50 to the interior of the chamber 40, and in particular between the plates of an accelerator 52 functioning as an ion extractor. The accelerator 52 is placed above a vapor source 54 which is typically an electron beam evaporator for uranium contained within a reservoir. The evaporator provides a radially expanding vapor flow into the accelerator 52 over the axial length of the chamber 40.

This is more clearly illustrated in FIG. 3, where the vapor source is shown to include a crucible 56 having a supply 58 of uranium which is evaporated by the impact of a linear magnetically focused electron beam 60 to expand into the region of the accelerator 52. The accelerator 52 is defined as a set of chambers 62 bounded by collection plates 64 and having therein a central anode electrode 66. Between the anode 66 and collection plates 64 within the chamber 62 are regions 68 of laser illumination. The pattern of regions 68 may be achieved by producing multiple reflections of the beam 46 and/or by optical beam shaping to the approximate desired cross-section. Other techniques may also be employed for this purpose.

The laser illuminated regions 68 are illuminated in pulses which are directly followed by a pulse of electric field between the anodes 66 and, typically, the collection plates 64 or plasma environment generally through a pulsed voltage source 70.

The beam 46 is typically a composite beam containing the three colors for the transitions 12, 18 and 22 and provided as illustrated in FIG. 4. Typically, a set of three dye lasers 80, 82 and 84 are provided with their output beams applied to a beam combiner 86 which may be a prism or dichroic element. The beam combiner 86 provides the composite output beam 46 applied to the chamber 40 in FIG. 2.

The lasers 80, 82 and 84 are controlled by a timer 88 typically to produce coincident pulses of at least a substantial fraction of a microsecond duration for application as the composite beam 46 to the chambers.

For the purposes of identifying the frequencies of the desired transitions 22 of augmented cross-section, a motor 90 may be provided to control the tuning of an element, such as grating 92, within a cavity 94 defined by mirrors 95 and 97 of the laser 84 to thereby scan the frequency of an output beam 96 from the laser 84. By thus slowly varying the radiation frequency, different amounts of ionization are produced within the chamber 62 and in particular the region 68 of application of the laser beam. The rate of ionization at any isotope number may then be detected by the use of a conventional mass spectrometer 98 having a probe 100 within the chamber 40 to detect ions resulting from photoionization and/or acceleration as is known in the art.

For the purposes of production level laser enrichment, the lasers 80, 82 and 84 are preferably augmented with several stages of amplification. And in addition, to achieve desired pulse repetition rates, it may be desired to employ a multiplicity of laser systems for each laser 80, 82 and 84, each fired sequentially and pulse-combined to produce an augmented pulse rate through the mechanism of rotating optical elements as is described in U.S. Pat. No. 3,924,937.

Having described above the details of the method and apparatus of the present invention, it will occur to those skilled in the art that various modifications and alterations may be made to the invention without departing from its scope. It is accordingly intended to define the invention only as indicated in the following claims.

We claim:

1. A method for ionizing particles of a selected isotope in an environment of plural isotope types comprising the steps of:
   selectively exciting the particles of said selected isotope type in one or more energy steps to an excited state;
   applying ionizing radiation of a predetermined broad spectral width and frequency and tuned to an ionization transition of increased cross-section having an absorption line at a predetermined ionization absorption peak for the particles in said excited state which both excites the particles from the excited state to a bound state within a predetermined energy range above the ionization level and excites the particles with a predetermined frequency which is absorbed more strongly than absorption at immediately adjacent frequencies by at least an order of magnitude.

2. The method of claim 1 wherein the step of selectively exciting includes the step of exciting in at least three energy steps to said excited state.

3. The method of claim 1 wherein said electromagnetic radiation is tuned within a range of approximately 5,800 to 6,000 angstroms.

4. The method of claim 1 wherein said predetermined energy range is approximately 50 to 300 $cm^{-1}$ above the ionization level.

5. The method of claim 1 wherein:
   the step of selectively exciting includes applying at least one frequency of narrow band radiation tuned selectively for an absorption line of said selected isotope; and
   said predetermined spectral width is substantially greater than the spectral width of said narrow band radiation.

6. The method of claim 5 wherein said predetermined spectral width is on the order of magnitude of approximately 0.5 angstroms.

7. The method of claim 1 further including the steps of:
   varying the frequency of said electromagnetic radiation over a range including said predetermined frequency and frequencies either side thereof which are less strongly absorbed by particles in said excited state; and
   detecting the degree of absorption by the particles in said excited state over the range of frequency variation.

8. The method of claim 1 wherein said particles include uranium atoms.

9. The method of claim 8 wherein the selected isotope is the U-235 isotope.

10. The method of claim 1 further including the step of separating the particles excited to said state above the ionization level from said environment.

11. The method of claim 1 wherein said separating step includes applying crossed electric and magnetic fields.

12. The method of claim 11 wherein said electromagnetic radiation includes laser radiation.

13. The method of claim 1 wherein said step of selectively exciting includes exciting in two energy steps.

14. The method of claim 1 wherein the selectively exciting step includes the step of applying laser radiation.

15. The method of claim 1 wherein the step of applying electromagnetic radiation includes producing autoionization of particles in said excited state.

16. The method of claim 15 wherein the autoionization step is generally produced without isotopic selectivity with respect to particles in said excited state.

17. A method for ionizing particles of a selected isotope in an environment of plural isotope types including the steps of:
   selectively exciting particles of said selected isotope to a level below ionization therefor;
   applying to the excited particles photons of energy tuned to an ionization absorption peak to further excite the particles to a bound energy state substantially above the ionized level, and which bound state has a short finite life time, substantially less than a nanosecond, before degenerating to an ion and released electron;
   the energy of said photons spanning an energy range substantially greater than the isotope shift for isotopes of said plural isotope types including the selected isotope type and centered on a predetermined ionization absorption peak for said particles which is greater by at least an order of magnitude than the absorption for immediately neighboring photon energies.

18. The method of claim 17 wherein said energy range is at least approximately 1.5 $cm^{-1}$.

19. The method of claim 17 wherein said excited state life time is approximately $10^{-1}$ seconds and said energy range is at least approximately 100 GHZ.

20. The method of claim 17 wherein said bound excited state is within the range approximately 50 to 300 $cm^{-1}$ above the ionization level for said particles.

21. The method of claim 17 wherein the energy of the applied photons corresponds approximately to 5800 to 6000 angstroms.

22. Apparatus for ionizing particles of a selected isotope in an environment of plural isotope types comprising:
   means for selectively exciting the particles of said selected isotope type in one or more energy steps to an excited state;

means for applying ionizing radiation of a predetermined broad spectral width and frequency and tuned to an ionization transition of increased cross-section having an absorption line at a predetermined ionization absorption peak for the particles in said excited state which both excites the particles from the excited state to a bound state within a predetermined energy range above the ionization level and excites the particles with a predetermined frequency which is absorbed more strongly than absorption at immediately adjacent frequencies by at least an order of magnitude.

23. The apparatus of claim 22 wherein the means for selectively exciting includes means for exciting in at least three energy steps to said excited state.

24. The apparatus of claim 22 wherein said electromagnetic radiation is tuned within a range of approximately 5,800 to 6,000 angstroms.

25. The apparatus of claim 22 wherein said predetermined energy range is approximately 50 to 300 cm$^{-1}$ above the ionization level.

26. The apparatus of claim 22 wherein:
the means for selectively exciting includes means for applying at least one frequency of narrow band radiation tuned selectively for an absorption line of said selected isotope; and
said predetermined spectral width is substantially greater than the spectral width of said narrow band radiation.

27. The apparatus of claim 26 wherein said predetermined spectral width is on the order of magnitude of approximately 0.5 angstroms.

28. The apparatus of claim 22 wherein said particles include uranium atoms.

29. The apparatus of claim 28 wherein the selected isotope is the U-235 isotope.

30. The apparatus of claim 22 further including means for separating the particles excited to said state above the ionization level from said environment.

31. The apparatus of claim 30 wherein said separating means includes means for applying crossed electric and magnetic fields.

32. The apparatus of claim 22 wherein said electromagnetic radiation includes laser radiation.

33. The apparatus of claim 22 wherein said means for selectively exciting includes means for exciting in two energy steps.

34. Apparatus for ionizing particles of a selected isotope type in an environment of plural isotope types including:

means for selectively exciting particles of said selected isotope to a level below ionization therefor;
means for applying to the excited particles photons of energy tuned to an ionization absorption peak to further excite the particles to a bound energy state substantially above the ionized level, and which bound state has a short but finite life time, substantially less than a nanosecond, before degenerating to an ion and released electron;
the energy of said photons spanning an energy range substantially greater than the isotope shift for isotopes of said plural isotope types including the selected isotope type and centered on a predetermined ionization absorption peak for said particles which is greater by at least an order of magnitude than the absorption for immediately neighboring photon energies.

35. The apparatus of claim 34 wherein said energy range is at least approximately 1.5 cm$^{-1}$.

36. The apparatus of claim 34 wherein said excited state life time is approximately 10$^{-11}$ seconds and said energy range is at least approximately 100 GHZ.

37. The apparatus of claim 34 wherein said bound excited state is within the range of approximately 50 to 300 cm$^{-1}$ above the ionization level for said particles.

38. The apparatus of claim 34 wherein the energy of the applied photons corresponds approximately to 5800 to 6000 angstroms.

39. A method for ionizing particles of a selected isotope type in an environment of plural isotope types, the selected isotope type having an ionization level above which the particles can exist in an ionized condition comprising the step of:
producing an energy transition in particles of said selected isotope type to a bound energy level above the ionization level for said particles by applying radiant energy of a predetermined frequency to said environment, the predetermined frequency of said radiant energy being selected to produce said energy transition at an absorption peak which results in the bound energy level exhibiting a finite life time, said bound energy level being characterized by an electronically excited ion particle core and a loosely bound electron, said predetermined frequency being such that the radiant energy producing said energy transition at said absorption peak is more strongly absorbed than radiant energy of frequencies corresponding to adjacent transitions by at least an order of magnitude, said electronically excited ion particle core and loosely bound electron decaying to an ion and a free electron after excitation.

* * * * *